US005555339A

United States Patent [19]

Migny et al.

[11] Patent Number: 5,555,339
[45] Date of Patent: Sep. 10, 1996

[54] DISPLAY MATRIX COMPRISING LIGHT-EMITTING FIBERS THAT ARE MASKABLE BY DISKS EACH HAVING A PLURALITY OF SECTORS

[75] Inventors: Philippe Migny; Pierre Passet, both of Saint Cyr-sur-Loire, France

[73] Assignee: Securite et Signalisation - S.E.S., France

[21] Appl. No.: 418,822

[22] Filed: Apr. 7, 1995

[30] Foreign Application Priority Data

Apr. 7, 1994 [FR] France .................................. 94 04106

[51] Int. Cl.$^6$ ...................................................... G02B 6/04
[52] U.S. Cl. ............................................ 385/115; 385/901
[58] Field of Search .................................... 385/115, 901; 345/32, 108, 109, 110, 111; 340/815.58, 815.64, 815.68; 359/234

[56] References Cited

U.S. PATENT DOCUMENTS 3,962,702 6/1976 Kriege .................................... 385/901
4,524,271 6/1985 Parker .................................... 359/234
4,794,391 12/1988 Costa et al. .

FOREIGN PATENT DOCUMENTS 2148570 5/1985 United Kingdom .

*Primary Examiner*—Rodney B. Bovernick
*Assistant Examiner*—Robert E. Wise
*Attorney, Agent, or Firm*—Brinks Hofer Gilson & Lione

[57] ABSTRACT

The invention relates to a display matrix having light-conveying fibers that are maskable by disks each having a plurality of sectors and rotated by non-reversible motors each having two stable positions and under the control of a display control device. Each disk is provided with a detector device for detecting at least one angular position of said disk and connected to a device for monitoring matching, which device is itself connected to the display control device and acts on an activation device for the motor of said disk. The detection device advantageously includes a photoelectric sensor and a reflecting element disposed on a light-blocking sector of the disk.

3 Claims, 4 Drawing Sheets

DISPLAY MATRIX COMPRISING LIGHT-EMITTING FIBERS THAT ARE MASKABLE BY DISKS EACH HAVING A PLURALITY OF SECTORS

FIELD OF THE INVENTION

The present invention relates to a display matrix formed by the downstream ends of a set of optical fibers whose upstream ends are disposed to receive light from a light source, the matrix being of the type in which the downstream ends of the optical fibers are associated individually or in very small sets with masking disks disposed in front of the downstream ends of the fibers concerned and each possessing a plurality of sectors suitable for being interposed on the light path in order to modify the color and/or the intensity of the light emitted forwards from the matrix, each of said disks being driven in stepwise rotation by a non-reversible motor having two stable equilibrium positions, with rotation of the motor being controlled by pulses, and in which a display control device is provided connected to said motors in order to control rotation of the disks in selected manner so as to transform the display at will.

BACKGROUND OF THE INVENTION

One such display matrix is known from document EP-0 109 328. The motor comprises a rotor constituted by a small magnet having two poles oriented radially relative to the axis of rotation, and a stator formed by a circuit that is magnetizable by pulses, and that is made of a material having good remanence, and that presents two poles which are diametrically opposite about the axis of the rotor, the rotor including, in the vicinity of each of its poles, an indexing element that is not aligned with the poles of the stator and that is designed to destabilize the position of the rotor at the moment that a pulse occurs. In motors of that type, when the stator receives a pulse of opposite polarity to the preceding pulse, the rotor turns through half a turn, and when the rotor receives two successive same-direction pulses, the second pulse has no effect.

When the disk includes light-blocking sectors alternating with light-transmitting identical sectors, it is connected to the shaft of the motor via a gear unit. Light is masked when the motor receives a pulse in a given direction and light is transmitted when the pulse is in the opposite direction.

Thus, with a masking disk that corresponds to two states, even without actually detecting the relative angular position of the masking disk relative to the fibers, there is never any ambiguity about the state of the mask. Only mechanical blockage preventing the disk from rotating can give rise to non-conformity between the required state and the real state of the mask.

However, as soon as it is desired to use a masking disk that generates more than two states, e.g. to generate different colors or different intensities of light, then it is necessary to make sure that after a given display instruction, the disks actually take up the requested angular positions relative to the optical fibers associated with each of them.

This requirement is particularly necessary in road safety applications where the safety aspect of the display is important and where it is necessary at all times to be able to rely on the quality of the displayed message.

OBJECT AND SUMMARY OF THE INVENTION

The object of the present invention is to provide a display matrix of the type in which the disks are capable of generating several states, and which satisfies the above requirement.

The invention achieves this object by each mask disk being associated with at least one detecting device for detecting at least one angular position of said disk, and by each motor being associated with an activation device connected to the display control device via a device for monitoring matching, said device for monitoring matching receiving signals from said detection device and acting on said activation device in the event of a mismatch between the signals received from the display control device and the signals emitted by said detection device.

Each display element of the matrix thus includes its own monitoring member which ensures that the angular position taken up by the disk actually matches the desired angular position and which otherwise causes said disk to rotate.

Advantageously, the detection device includes at least one reflecting element disposed on a light-blocking sector of the disk and at least one photoelectric sensor receiving light reflected by said reflecting element when said light-blocking sector lies on the path of the emitted by said photoelectric sensor.

BRIEF DESCRIPTION OF THE DRAWINGS

Other advantages and characteristics of the invention appear on reading the following description given by way of example and made with reference to the accompanying drawings, in which.

MORE DETAILED DESCRIPTION

Figure 1:
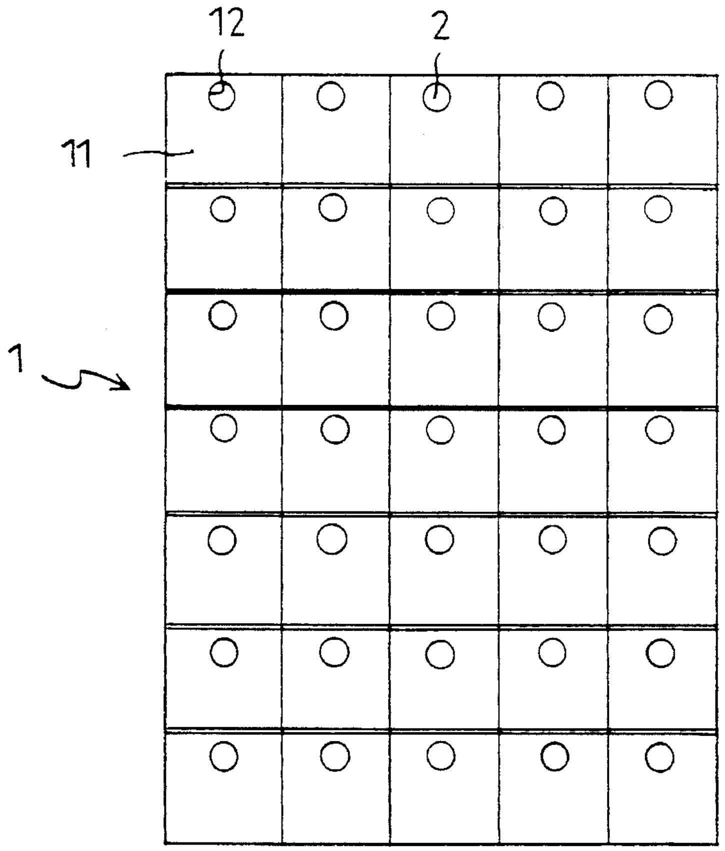
FIG. 1 is a front view of a display panel element.
Figure 2:
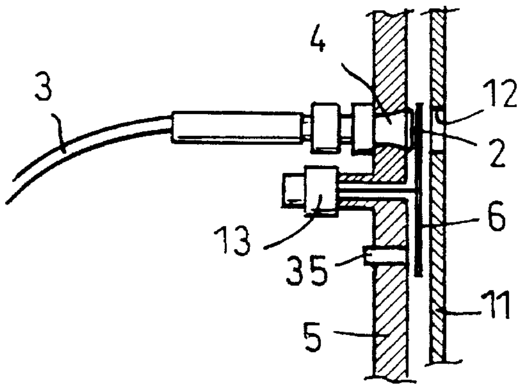
FIG. 2 is a section view through the end of a light conductor and the associated masking disk.
Figure 3:
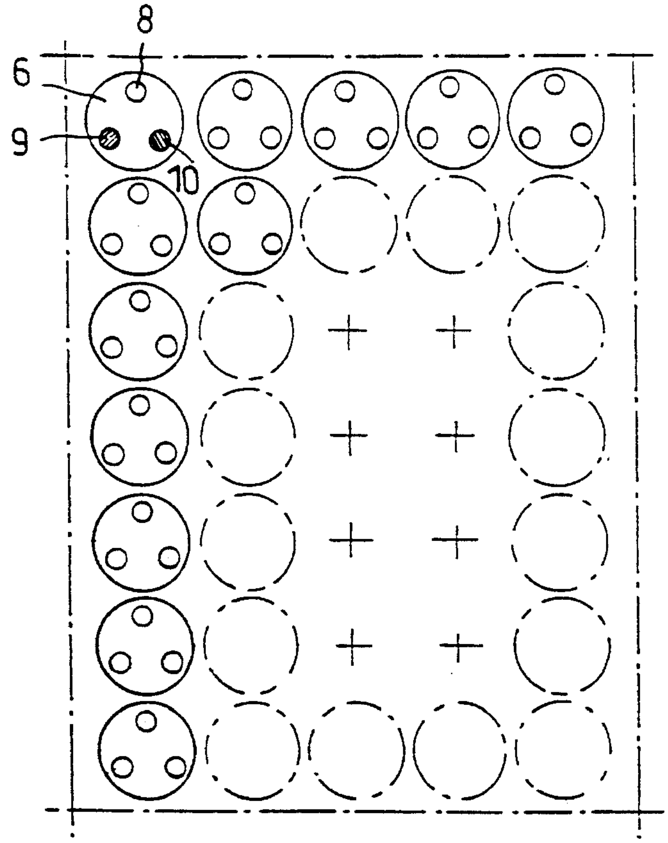
FIG. 3 is a front view of the FIG. 1 element, with the protective panel removed so as to show the masking disks.

FIG. 1 shows a display panel element 1 in the form of a display matrix comprising 7×5 cells, each cell having a side of about 28 mm. A complete display panel comprises a plurality of elements 1.

In each cell there terminates the downstream end 2 of an optical fiber light conductor 3 which is held in place by a conventional endpiece 4 that is received in the portion 5 that constitutes the body of each cell.

In front of the body 5 and in the immediate vicinity of the visible end 2 of the light conductor 3, a masking disk 6 is mounted to rotate about an axis 20 parallel to the axis of the endpiece 4. A plurality of openings 8, 9, and 10 are formed in the disk, each opening being centered on a circumference that includes the axis of the endpiece 4 of the light conductor when the disk 6 rotates.

When one of the openings comes in front of the endpiece of the light conductor, then light passes through and a spot of light can be seen. Depending on the desired results, the openings may be left free or they may be provided with color filters.

When a solid portion comes in front of the endpiece 4 of the light conductor 3, then the light spot becomes invisible.

A plate 11 pierced with holes 12 on the axis of the endpieces 4 of the conductors 3 may be installed at the front of each cell or at the front of a plurality of cells for the purpose of protecting the disks 6. Where appropriate, each cell of the panel element can have terminating thereat, the ends of a very small set of optical fibers (e.g. three or four) coming from one or more light sources that may be switched on or not, that are associated with a common masking disk 6 whose rotation and openings are determined as a function of the disposition of said ends and of the desired results. By associating each disk 6 with a plurality of fibers it is possible to increase the brightness of the message by increasing the number of light ends that operate to constitute a single spot of the message, and/or to increase operating security in the event of a lamp failing, and/or to provide color filters upstream from the fibers, thereby increasing the color changing options available in the displayed message.

The masking disk 6 is rotated about its axis **20*b* by the rotor of an angular positioning motor 13** that has two stable positions.

The rotor of the motor 13 is constituted by a small magnet 14 having a high coercive field which is magnetized to have two poles that are disposed radially relative to the axis of rotation 7. The axis 7 is embodied by a shaft that drives stepdown gearing 21 for driving the axis 20 of the masking disk 6. In practice, the small magnet 14 may be constituted by a small cylinder of diametrically-magnetized plastoferrite.

The stator 15 is constituted by a magnetic circuit made of a material that has good remanence but a small coercive field. It may have any desired shape, providing that level with the magnet 14, its own two poles 16 and 17 are diametrically opposite about the axis 7 of the rotor.

Two indexing pins 18 and 19 are also provided in the form of two small pieces made of non-remanent magnetic material. They too are situated in the plane of rotation of the magnets 14 of the rotor, are diametrically opposite, and are both offset relative to the diameter running between the poles 16 and 17.

Short current pulses (typically shorter than 1 ms) delivered in one direction or the other to the coil 22 have the effect of magnetizing the stator 15 stably, because of its remanence.

Thus, in this example, if the north and south poles N and S of the stator 15 are swapped over, then the stable equilibrium position of the rotor is moved to 180° from its preceding stable equilibrium position.

Figure 4:
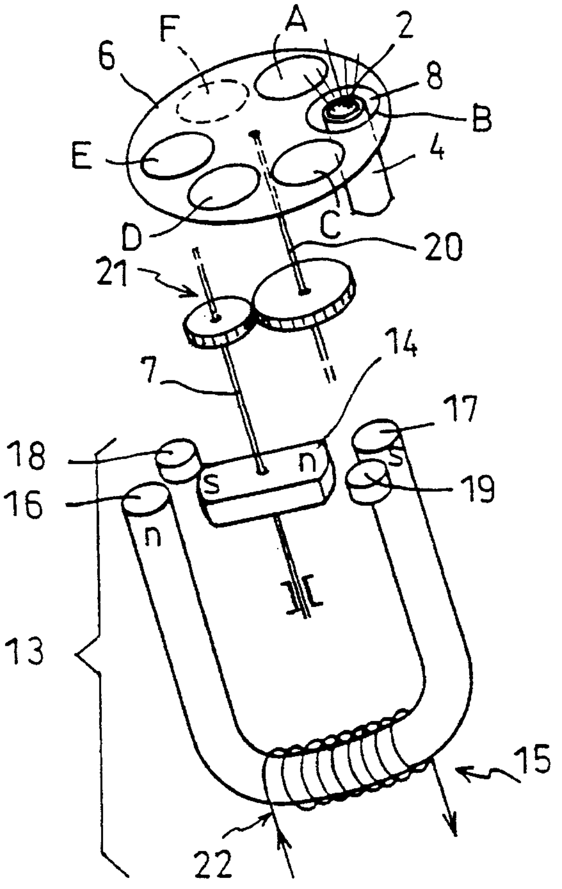
FIG. 4 is a perspective view of one embodiment of a masking disk motor.

However, it will readily be understood that in this configuration, if the rotor is accurately aligned on the N–S line of the stator 15, then although reversing the magnetization does indeed transform a stable equilibrium position into an unstable position, it nevertheless provides no torque to the rotor; it is therefore necessary to prime the motion thereof so as to enable it to find its new stable position which is half a turn from its previous stable position. This is the function of the indexing pins 18 and 19. When they are disposed as shown in FIG. 4, they cause the rotor to be defected from its stable position so that it is no longer accurately in alignment with the N–S line of the stator 15.

Thus, as soon as the poles have been reversed, magnetic repulsion does indeed generate a torque suitable for initiating motion, and so the rotor stabilizes in an exactly opposite position given that the pins 18 and 19 are not remanent, so they operate in the same manner regardless of which magnetic pole is presented to them.

A new current pulse in the same direction changes nothing. A new current pulse in the opposite direction causes the rotor to turn through 180° again, and in the same direction.

The masking disk 6 is thus driven stepwise and always in the same direction by the motor 13.

As can be seen in FIG. 4, the masking disk 6 may include, by way of example, a plurality of colored sectors 8 referenced A to E, plus a light-blocking sector F that is shown by a dashed outline.

According to the invention, each cell is provided with a device for monitoring the match between the angular position of the masking disk 6 and the desired angular position.

Figure 5:
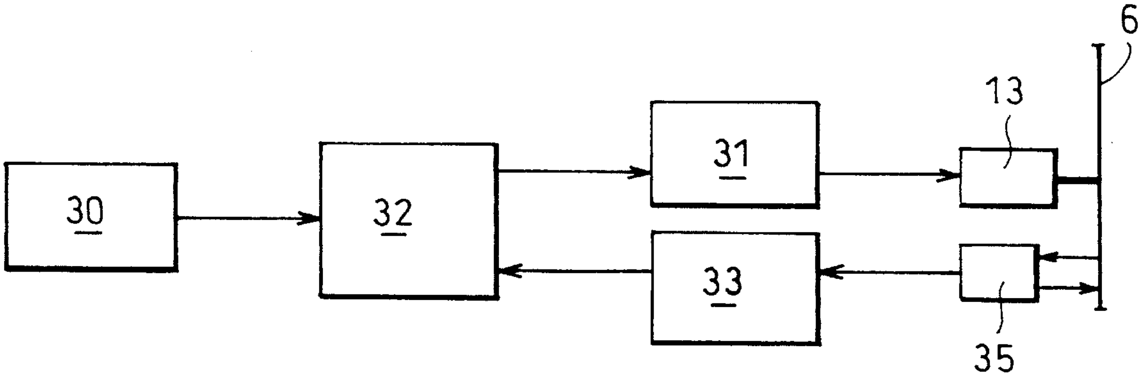
FIG. 5 is a block diagram of the device for monitoring the angular position of a masking disk.

In FIG. 5, reference 30 designates the display control device for all of the cells, and reference 31 designates the device for activating the coil 22. The device 32 for monitoring proper matching is interposed between the display control device 30 and the activation device 31. The match monitoring device 32 is also connected to a device 33 for detecting the angular position of the masking disk 6 relative to the endpiece 4 of the light conductor.

As a function of the instruction issued by the display control 30, the matching device 32 electronically compares the state that the cell is required to take up with its real angular position as provided by the detector device 33.

The output signal from the detector device 33 is encoded to represent the state of the disk 6. Cell activation is considered as being good when said signal matches the image of the required state as stored in the electronic memory of the device 32 for monitoring matching.

By way of example, the detector device 33 may be an electromagnetic device with position encoding. Such a system makes it possible to monitor the absolute position of the disk 6. This can be achieved by means of three sensors that, in combination, are capable of identifying eight positions. A first embodiment may consist in fitting the secondary shaft 20 that actually drives the masking disk 6 with three cams that are appropriately distributed to open or close miniature electrical contacts during rotation of the shaft 20. The state of the contacts at the end of rotation provide an image of the position of the disk 6.

The detector device 33 may also be implemented by including at least one photoelectric component (emitter or receiver) in each cell, the component being constituted by a photoelectric sensor 35 for detecting reflecting elements 36 placed on the back of the disk 6. The reflecting elements are advantageously applied to masking sectors F of the disk 6, and the sensor 35 is located facing one of the sectors of the disk when in its stopped position.

When the disk 6 has only one light-blocking sector F, the exact position of the disk 6 can be discovered using a single photoelectric sensor 35. However, when the disk 6 has a plurality of light-blocking sectors, the exact position of the disk 6 in several states can be obtained using a small number of suitably located photoelectric sensors.

Figure 6:
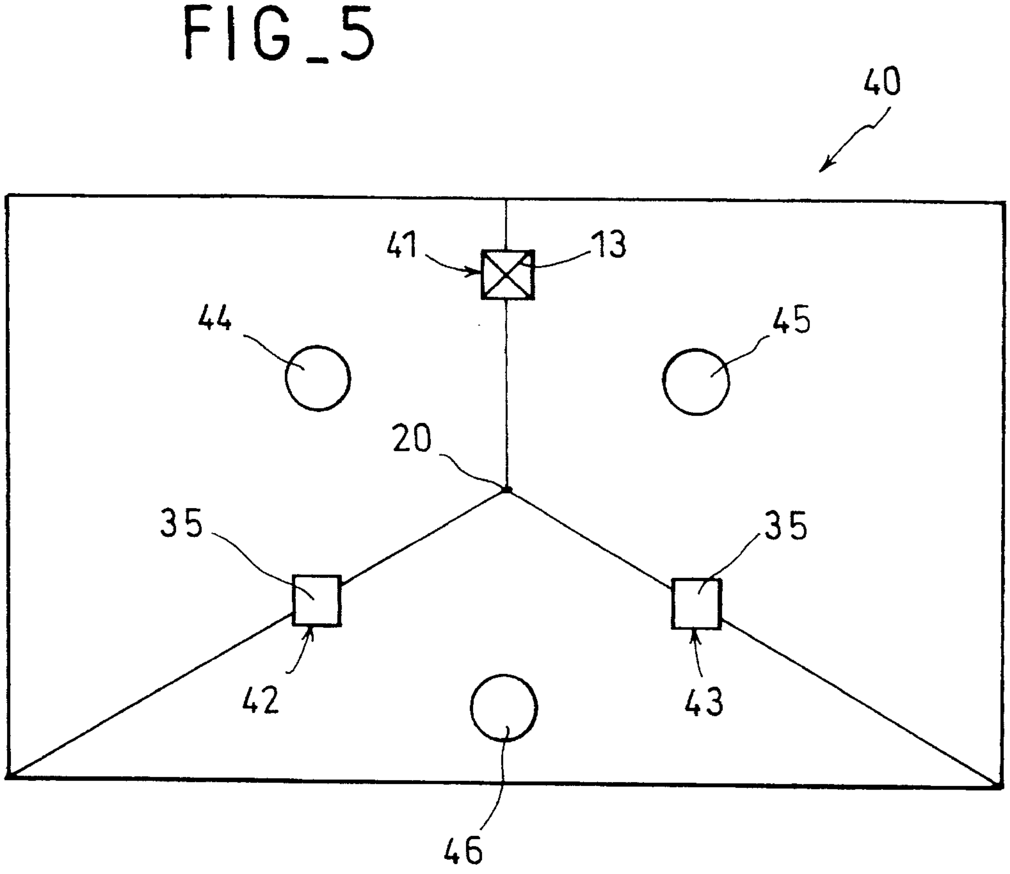
FIG. 6 is an elevation view of a cell of the matrix showing the respective disposition of the motor, the sensors, and the optical fibers.

In FIG. 6, there can be seen a cell 40 subdivided into six zones that are disposed facing six sectors of a masking disk 6. Reference 41 represents the position of the motor 13, references 42 and 43 represent possible positions of two photoelectric sensors 35, and references 44, 45, and 46 represent the possible positions of the downstream ends of light conductors.

Figure 7:
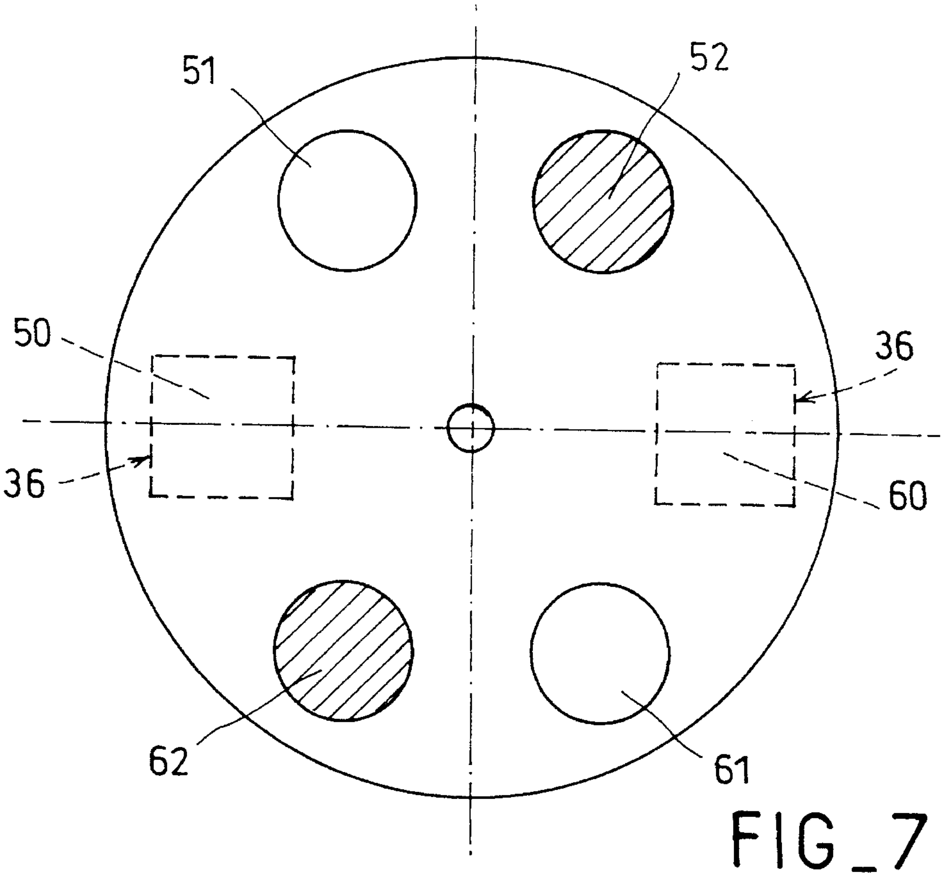
FIG. 7 is a rear view of a first example of a six-sector disk.

In a first embodiment, as shown in FIG. 7, the disk 6 comprises two light-blocking sectors 50 and 60 that are diametrically opposite, two sectors 51 and 61 of color 1 that are likewise diametrically opposite, and two sectors 52 and 62 of color 2. The positions 42 and 43 are 120° apart about the axis of rotation 20 of the disk 6.

If the cell 40 has only one position sensor 42, then position monitoring is not perfect since there are two positions of the disk 6 that display differently and that the sensor 35 is incapable of distinguishing.

In contrast, if sensors 35 are provided in both positions 42 and 43, then by combining the states from these two sensors, each angular position of the mask can be identified.

Figure 8:
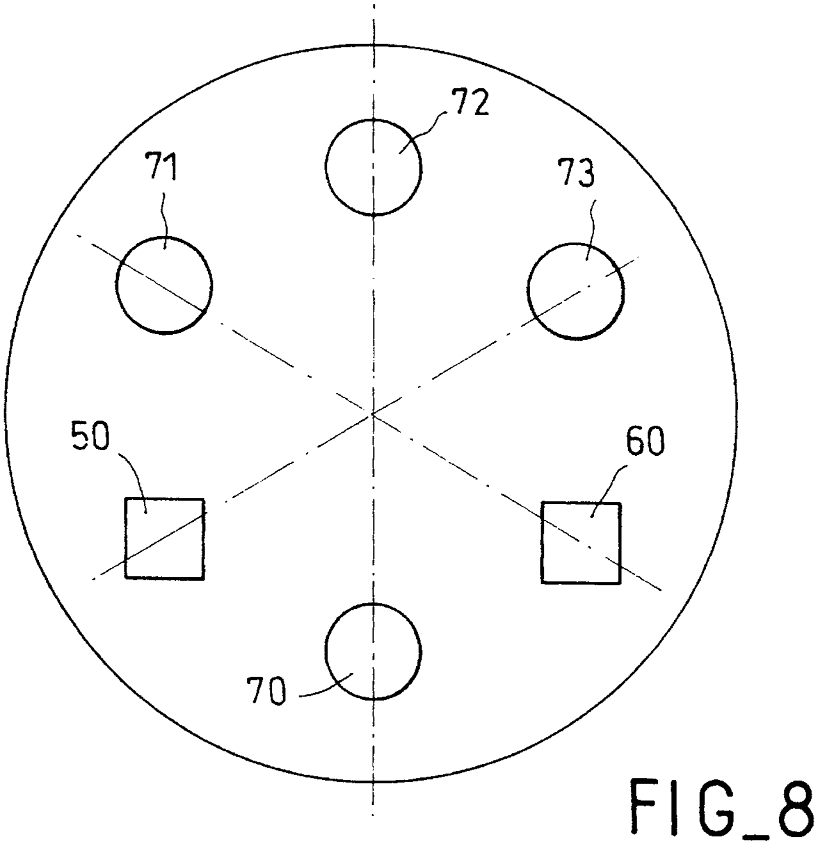
FIG. 8 is a rear view of a second example of a disk that includes six sectors.

In a second embodiment that is shown in FIG. 8, the disk 6 has four colored sectors 70, 71, 72, and 73, plus two light-blocking sectors 50 and 60 each provided with reflecting elements and that are disposed at 120° from each other, and two photoelectric sensors 35 are provided in positions 42 and 43 of the cell 40. It is possible to identify unambiguously three positions of the disk 6, with the other three positions giving rise to absences of detection.

These three unidentified positions correspond to sector 72 situated at 120° from the light-blocking sectors. When sector 72 overlies one of the positions 44, 45, or 46, then neither of the sensors 35 is facing a reflecting element.

When the disk 6 has three light-blocking sectors 50, 60, and 72 at 120° intervals, plus three interposed colored sectors 70, 71, 73, but only two reflecting elements placed on the backs of sectors 50 and 60, it is possible to discover the exact position of the disk 6 using the two photoelectric sensors 35 and regardless of the particular zone in the cell 40 where the optical fibers terminate.

We claim:

1. A display matrix formed by the downstream ends of a set of optical fibers whose upstream ends are disposed to receive light from a light source, the matrix being of the type in which the downstream ends of the optical fibers are associated individually or in sets with masking disks disposed in front of the downstream ends of the fibers concerned and each of said masking disks possessing a plurality of sectors interposable in the light path in order to modify the color and/or the intensity of the light emitted forwards from the matrix, each of said disks being driven in stepwise rotation by a non-reversible motor having two stable equilibrium positions, with rotation of the motor being controlled by pulses, and in which a display control device is provided connected to said motors in order to control rotation of the disks in selected manner so as to transform the display at will, wherein each mask disk is associated with at least one detecting device for detecting at least one angular position of said disk, and wherein each motor is associated with an activation device connected to the display control device via a device for monitoring matching, said device for monitoring matching receiving signals from said detection device and acting on said activation device in the event of a mismatch between the signals received from the display control device and the signals emitted by said detection device.

2. A display matrix according to claim 1, wherein the detection device includes at least one reflecting element disposed on a light-blocking sector of the disk and at least one photoelectric sensor receiving light reflected by said reflecting element when said light-blocking sector lies on the path of the light emitted by said photoelectric sensor.

3. A display matrix according to claim 2, wherein the disk has six sectors, and wherein it is provided with two photoelectric sensors disposed at 120° from each other about the axis of rotation of the disk.

* * * * *